No. 877,023. PATENTED JAN. 21, 1908.
C. H. WAY.
ENGINE.
APPLICATION FILED MAR. 30, 1905.
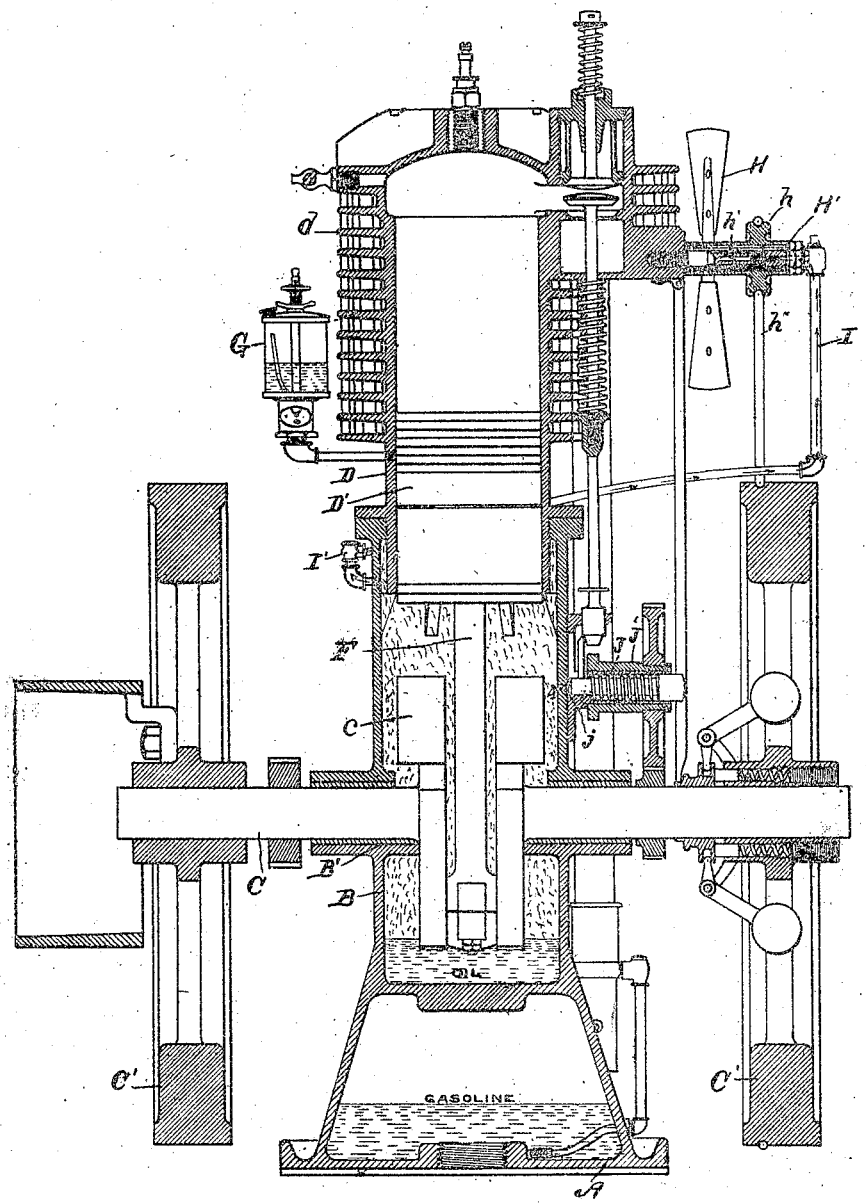
WITNESSES:
INVENTOR
Charles H. Way
BY Chappell & Earl
ATTORNEY.

UNITED STATES PATENT OFFICE.

CHARLES H. WAY, OF LANSING, MICHIGAN, ASSIGNOR TO "NEW WAY" MOTOR COMPANY, OF LANSING, MICHIGAN.

ENGINE.

No. 877,023.   Specification of Letters Patent.   Patented Jan. 21, 1908.

Application filed March 30, 1905. Serial No. 252,926.

*To all whom it may concern:*

Be it known that I, CHARLES H. WAY, a citizen of the United States, and a resident of the city of Lansing, in the county of Ingham, State of Michigan, have invented certain new and useful Improvements in Engines, of which the following is a Specification.

This invention relates to improvements in engines.

It relates particularly to improvements in lubricating means for explosion engines, although it is adapted to other classes of engines.

The main object of this invention is to provide an improved engine construction in which the bearings are positively lubricated by the operation of the engine.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, which is a vertical sectional view of such engine.

Referring to the drawing, the base A is of suitable construction, preferably adapted to serve as a storage for the liquid hydrocarbon. The crank shaft casing B is supported by the base and preferably made integral therewith. The crank shaft casing B is provided with suitable bearings B' for the crank shaft C. A pair of fly wheels C' are arranged on the ends of the crank shaft to secure a balanced structure. The engine cylinder is mounted in the upper end of the crank shaft casing and its inner end opens therein.

The crank shaft casing B is entirely inclosed and forms a receptacle for the lubricant. The piston D' is connected to the crank shaft by the connecting rod F. Counterweights c are provided for the crank shaft. When the engine is in operation, the crank shaft with its counterweights strikes into the oil in the crank shaft casing as the crank shaft is revolved, splashing the same and atomizing portions thereof, so that it is admixed with the air in the crank shaft casing. The portions of the crank shaft bearings B' which project within the crank shaft casing, are cut away at the top so that the oil finds a ready passage to the crank shaft bearings. The splashing of the oil within the chamber, and also the atomization thereof, keeps the piston and connecting rod bearings effectively lubricated. The piston is lubricated by the oil cup G, and the surplus oil from the piston drops into the crank shaft casing to replenish the supply of oil therein.

The cylinder D is provided with suitable heat radiating fins d. A current of air is delivered onto the cylinder for cooling the same, by the fan H which is mounted at one side thereof on the spindle H'. The spindle H' is provided with a conduit h' which extends from the outer end thereof inwardly to the bearing. This conduit is connected by the pipe I to the crank shaft casing, as clearly appears in the drawing. At each instroke of the piston a portion of the oil laden air of the crank shaft chamber is forced into the pipe I and out through the oil duct h' of the spindle H' to lubricate the bearing of the fan H. A check valve I' is provided to prevent the return of the air on the outstroke of the piston.

By thus arranging the parts, when the engine is in operation a continuous supply of the lubricant is delivered to the fan spindle H'. On each outstroke of the piston the air is drawn into the crank shaft chamber through the bearings for the crank shaft. Other inlets might be provided, but I find that in practice such inlets are unnecessary. On the instroke of the piston the lubricant is also forced into the crank shaft bearings.

A hollow spindle J for the valve operating cam J' is mounted on the crank shaft casing and communicates therewith by a perforation j. Thus connected, on the instroke of the piston the lubricant laden air is forced through the perforation j to lubricate the spindle. The cam J' is suitably geared to the crank shaft, but as this connection forms no part of the invention, I do not describe it in detail, and as the valves and the governor and their connections form no part of this invention they are not here described.

By my improved construction all the bearings of the engine are effectively and positively lubricated by the operation thereof. The blower H—which is driven at a very high rate of speed, preferably by a belt h'' from one of the fly wheels C' to the fixed pulley $h$—is kept constantly supplied with the lubricant. The cam shaft or spindle is also effectively lubricated, as are also the connecting rod bearings and the crank shaft, it only being necessary, in order that the parts may be effectively lubricated, to keep up the supply of oil, and this is found in practice to be effectively maintained by the sight feed or other lubrication for the piston, so that it is only necessary to give attention to the oil cup G. A supply of oil is introduced into the chamber to begin with and is replenished from the oil cup.

I have illustrated and described my improved engine in detail in the form preferred by me, although I am aware that it is capable of considerable structural variation without departing from my invention.

Having thus described my invention, what I claim as new and desire to secure by Letters Patent, is:

1. The combination with a crank shaft casing forming an inclosed chamber and adapted to serve as a lubricant receptacle; a cylinder opening at its inner end into said chamber; a crank shaft having counterweights thereon, said crank shaft and counterweights being adapted to strike into the lubricant as the crank shaft is revolved, whereby the said lubricant is atomized; a piston; a connecting rod; a bearing connected to said crank shaft casing by a suitable conduit, said conduit opening into said casing at a point above the oil therein, said piston being adapted on its in-stroke to compress the air in the crank-shaft casing and force the atomized lubricant through the conduit to the bearing; and a check valve for said conduit.

2. The combination with a crank shaft casing forming an inclosed chamber and adapted to serve as a lubricant receptacle; a cylinder opening at its inner end into said chamber; a crank shaft having counterweights thereon, said crank shaft and counterweights being adapted to strike into the lubricant as the crank shaft is revolved, whereby the said lubricant is atomized; a piston; a connecting rod; a bearing connected to said crank shaft casing by a suitable conduit, said conduit opening into said casing at a point above the oil, said piston being adapted on its in-stroke to compress the air in the crank-shaft casing and force the atomized lubricant through the conduit to the bearing.

3. The combination with a crank shaft casing forming an inclosed chamber and adapted to serve as a lubricant receptacle; a cylinder opening at its inner end into said chamber; a crank shaft adapted to strike into the lubricant as the crank shaft is revolved, whereby the said lubricant is atomized; a piston; a connecting rod; a bearing connected to said crank shaft casing by a suitable conduit, said conduit opening into said casing at a point above the oil therein, whereby, on the in-stroke of the piston, the atomized lubricant will be forced through the conduit to the bearing; and a check valve for said conduit.

4. The combination with a crank shaft casing forming an inclosed chamber and adapted to serve as a lubricant receptacle; a cylinder opening at its inner end into said chamber; a crank shaft adapted to strike into the lubricant as the crank shaft is revolved, whereby the said lubricant is atomized; a piston; a connecting rod; and a bearing connected to said crank shaft casing by a suitable conduit, said conduit opening into said casing at a point above the oil therein, said piston being adapted on its in-stroke to compress the air in the crank-shaft casing and force the atomized lubricant through the conduit to the bearing.

5. The combination with a crank shaft casing forming an inclosed chamber and adapted to serve as a lubricant receptacle; a crank shaft having counterweights thereon, said crank shaft and counterweights being adapted to strike into the lubricant as the crank shaft is revolved, whereby the said lubricant is atomized; a bearing connected to said crank shaft casing by a suitable conduit opening into said casing at a point above the oil, whereby the atomized lubricant is conducted to the bearing; and a check valve for said conduit.

6. The combination with a crank shaft casing forming an inclosed chamber and adapted to serve as a lubricant receptacle; a crank shaft adapted to strike into the lubricant as the crank shaft is revolved, whereby the said lubricant is atomized; a bearing connected to said crank shaft casing by a suitable conduit opening into said casing at a point above the oil, whereby the atomized lubricant is conducted to the bearing; and a check valve for said conduit.

In witness whereof I have hereunto set my hand and seal in presence of two witnesses.

CHARLES H. WAY. [L. S.]

Witnesses:
HARRIS E. THOMAS,
WILLIAM H. NEWBROUGH.